Patented Dec. 27, 1949

2,492,169

UNITED STATES PATENT OFFICE 2,492,169

SYNTHETIC RUBBERLIKE MATERIALS FROM AN ALKYL ACRYLATE AND A DI-OLEFINICALLY UNSATURATED ETHER

William C. Mast and Lee T. Smith, Philadelphia, and Charles H. Fisher, Abington, Pa., assignors to United States of America as represented by the Secretary of Agriculture No Drawing. Application May 25, 1945, Serial No. 595,867

7 Claims. (Cl. 260—79.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to synthetic rubbers prepared from alkyl acrylate polymers and copolymers.

It is known that the polymers of methyl acrylate, ethyl acrylate, and other normal alkyl acrylates are soft and flexible. Furthermore, it is known that useful flexible materials can be made by blending alkyl acrylate polymers with other materials or by incorporating fillers and pigments into them. The resulting products, however, lack some of the desirable characteristics found in rubber and in certain synthetic rubbers, and several unsuccessful attempts have been made to transform the flexible alkyl acrylate polymers into true synthetic rubbers. Vulcanization does not occur when polymers, such as polymethyl acrylate and polyethyl acrylate, are heated with sulfur. We have attempted vulcanization by heating alkyl acrylate polymers containing sulfur, and mixtures of such polymers, sulfur, carbon black, and some of the standard accelerators used with rubber, without successful results. No appreciable change is brought about by heating such mixtures, and the products lack many of the desirable properties found in vulcanized rubber and vulcanized synthetic rubbers.

An object of this invention, accordingly, is to produce vulcanized alkyl acrylate polymers having enhanced rubberlike properties and capable of being used in place of rubber.

Another object is to prepare alkyl acrylate polymers which can be compounded and milled on standard rubber rolls and equipment, and cured or vulcanized in standard rubber molds to give vulcanized synthetic rubbers.

A further object is to produce synthetic rubbers which have greater resistance to light, oils, oxidation, aging, and heat, than has natural rubber or some of the previously described synthetic rubbers.

A further object is to provide synthetic rubbers which can be made from carbohydrates, an abundant and reproducible raw material.

A further object is to provide methods for copolymerizing methyl acrylate, ethyl acrylate, and similar alkyl acrylates, particularly methods of polymerization which permit linear growth but prevent or retard cross-linkage, thus giving polymers having olefinic unsaturation available for vulcanization.

Other objects and advantages of the invention will appear hereinafter.

We have found that synthetic rubbers can be made by copolymerizing methyl acrylate and/or other alkyl acrylates with small proportions of polymerizable polyolefinic ethers containing two or more olefinic linkages, such as divinyl ether, diallyl ether, dimethallyl ether, and the diallyl ether of ethylene glycol, mixing the resulting copolymers with sulfur, carbon black, vulcanization accelerators, and other materials commonly employed in the vulcanization of rubber, and heating the resulting mixtures under the general conditions commonly used to vulcanize rubber and other synthetic rubbers. We have found that such copolymers can be vulcanized when the copolymer is prepared from a monomer mixture containing, as monomeric components, the alkyl acrylate and the polyolefinic ether in the proportion, by weight, of at least 80 per cent of the acrylate to at least 1 percent of the ether. Moreover, we have found that cross-linkage can be decreased during the polymerization by the presence of polymerization regulators such as mercaptans, or acrylonitrile, or both, the use of dodecyl mercaptan and acrylonitrile being particularly satisfactory. Other polymerization regulators, such as carbon tetrachloride, hexachloroethane, xanthogen disulfide, and trichloropropionitrile, can also be used to decrease cross-linkage. We have found also that emulsion, mass or solution polymerization methods can be used to give vulcanizable copolymers. Acrylonitrile or other polymerization regulators preferably are used in these polymerizations, but synthetic rubbers may be prepared without their use.

In the following examples, emulsion polymerization, as described in the following paragraph, was used as a matter of convenience to prepare the copolymers, but they can be made by solution or by mass polymerization.

The polymerizations in general were carried out in round-bottomed, three-necked, Pyrex-glass flasks fitted with a thermometer well reflux condenser and a water-sealed stirrer (ground-glass joints). The stirrers were of the paddle, anchor, or half-moon type and were rotated at about 75 to 150 R. P. M. The monomer mixture was added to water and an emulsifying agent in the flask, stirred, and heated to about refluxing temperature. The desired amount of catalyst was then added, either all at once or in several portions.

Heating was applied if necessary to maintain gentle refluxing, and the course of the polymerization was followed by noting changes in the refluxing temperature. When refluxing ceased in spite of heating (usually about 92° C.), the polymerization was finished. The emulsion was then poured into a beaker and coagulated by the addition of a dilute salt solution such as sodium chloride, washed with water, and dried.

Example I

Using the general method described above, 97.9 g. of ethyl acrylate and 2.1 g. of divinyl ether were copolymerized in the presence of 3 g. of sodium alkyl sulfate (emulsifier) and 0.01 g. of ammonium persulfate (catalyst). The polymerization lasted 0.5 hour and the yield was 96 percent. One hundred parts of the washed and dried copolymer were compounded with 0.5 part mercaptobenzothiazole, 5 parts zinc oxide, 3 parts stearic acid, 2 parts of sulfur, and 1 part of tetramethylthiuram disulfide, and the compounded mixture was then vulcanized at about 298° F. for about 180 minutes. The vulcanizate had a tensile strength of about 380 lbs. per square inch and an ultimate elongation of about 950 percent.

Example II

Using the general method described above, but incorporating a polymerization regulator in addition, 91.9 g. of ethyl acrylate, 2.1 g. divinyl ether, and 6 g. acrylonitrile (as the polymerization regulator) were copolymerized in the presence of 3 g. sodium alkyl sulfate (emulsifier) and 0.03 g. ammonium persulfate (catalyst). The operation lasted 0.67 hour, and the yield of copolymer was 93 percent. When compounded as in Example I and vulcanized at about 298° F. for about 180 minutes, the tensile strength of the vulcanizate was about 1,280 lbs. per square inch, the elongation at break was about 960 percent, the Shore A hardness was about 48, and the brittle point was about −12° C.

Example III

Ethyl acrylate, divinyl ether, and acrylonitrile were copolymerized as in Example II, with the exception that 0.1 ml. of dodecyl mercaptan (as an additional polymerization regulator) was added prior to the copolymerization. The copolymer was compounded as in Examples I and II and vulcanized at about 298° F. for about 180 minutes. The vulcanizate had a tensile strength of about 910 lbs. per square inch and an ultimate elongation of about 1,280 percent.

Example IV

Ethyl acrylate (97 g.) and diallyl ether (3 g.) were copolymerized in the presence of sodium alkyl sulfate (3 g.) and ammonium persulfate (.03 g.) and water (300 g.). The polymerization lasted 75 minutes and the yield was 88 percent. The polymer was strong and rubbery.

Example V

Ethyl acrylate (144 g.) and methallyl ether (6 g.) were copolymerized in the presence of 4 g. sodium alkyl sulfate, 0.03 g. of ammonium persulfate, and 250 g. water. The polymerization time was 45 minutes. The yield was 91 percent of a tough, rubbery material.

Example VI

The copolymerization was the same as Example V, except that 6 g. of acrylonitrile displaced an equal amount of ethyl acrylate. Ammonium persulfate, .16 g., caused polymerization to take place in 2¾ hours and a yield of 93 percent of soft rubberlike material was obtained.

Example VII

The copolymerization was similar to Example VI except for the addition of a polymerization regulator (.2 g.). Polymerization was complete in 50 minutes with 0.1 g. ammonium persulfate and a yield of 80 percent of soft material was obtained.

Example VIII

To 200 ml. water and 2.5 g. sodium alkyl sulfate was added a mixture of 49 g. ethyl acrylate monomer and 1.2 g. of the diallyl ether of ethylene glycol. The addition of 0.03 g. ammonium persulfate and heat caused the polymerization to take place in 1¾ hours with a yield of 92 percent of a rubberlike material.

Example IX

To 200 ml. water and 2.5 g. sodium alkyl sulfate was added a mixture of 46 g. ethyl acrylate, 3 g. acrylonitrile, and 1.5 g. of the diallyl ether of ethylene glycol. The addition of 0.04 g. ammonium persulfate and heat caused polymerization to take place in 2 hours with a yield of 88 percent of a rubberlike material. When the copolymer was compounded and cured as in Example I, a vulcanizate was obtained having a tensile strength of 510 p. s. i., ultimate elongation of 580 percent, and 45 Shore A. hardness.

The practice of our invention is not limited to the agents mentioned herein. For example, many emulsifiers may be used instead of sodium alkyl sulfate, and various peroxides and percompounds may be used to initiate the polymerization.

In the above examples, prior to vulcanization, the compounding ingredients comprising a vulcanizing agent such as sulfur, a vulcanization accelerator such as mercaptobenzothiazole, tetramethylthiuram disulfide, etc., an accelerator activator such as stearic acid, and a reinforcing agent such as carbon black, zinc oxide, etc., were milled into the copolymers on a standard rubber mill which had steam-heated rolls. The copolymers were tacky and required little or no breakdown before forming a rolling bank. Large amounts of carbon black could be milled into the copolymers. The compounded mixtures were cured and tested with equipment and techniques used in the rubber and synthetic rubber industries. The vulcanized products were soft, flexible, elastic, and rubberlike in appearance and feel, were insoluble in hydrocarbon solvents and in water, and were resistant to oxygen, aging, and heat.

Although several successful curing or vulcanizing recipes are given in the examples, not all the agents used successfully to vulcanize rubber and certain other synthetic rubbers can be employed to vulcanize acrylic resins containing a small amount of olefinic unsaturation.

This invention is a valuable advance in the art as it extends the range of known rubber substitutes, giving new substitutes for rubber which, in some respects, have advantages over rubber. Furthermore, the synthetic rubbers described herein can be made almost entirely (through lactic acid as intermediate) from carbohydrates, an abundant, domestic, and reproducible raw material. The source of the small amount of polyolefinic ether used in making the copolymer is relatively unimportant because only small proportions are required and many types can be used.

Our products are essentially acrylic resins which can be vulcanized by virtue of the presence of a small amount of unsaturation in the copolymer.

Vulcanization, or cross-linkage of our unsaturated alkyl acrylate polymers can be effected by treatment with both sulfur and non-sulfur recipes, such as benzoyl peroxide, quinone dioxime, and quinone dioxime dibenzoate, as disclosed in a pending application of Charles H. Fisher and William C. Mast for Synthetic rubberlike materials, Serial No. 595,866, filed May 25, 1945.

Having thus described our invention, we claim:

1. A process of preparing a synthetic rubber comprising heating a mixture containing, as monomeric components, an alkyl acrylate and a polyolefinic ether selected from the group consisting of divinyl ether, diallyl ether, and dimethallyl ether in the proportion, by weight, of at least 80 percent of the acrylate to at least 1 percent of the ether, to effect copolymerization of said monomeric components, compounding the resulting copolymer with sulfur, and heating the compounded mixture to effect vulcanization.

2. The process of claim 1 wherein the polyolefinic ether is divinyl ether.

3. The process of claim 1 wherein the alkyl acrylate is ethyl acrylate.

4. The process of claim 1 wherein the polyolefinic ether is divinyl ether and the alkyl acrylate is ethyl acrylate.

5. A process of preparing a synthetic rubber comprising heating a mixture containing, as monomeric components, an alkyl acrylate and a polyolefinic ether selected from the group consisting of divinyl ether, diallyl ether, and dimethallyl ether in the proportion, by weight, of at least 80 percent of the acrylate to at least 1 percent of the ether, in the presence of a polymerization regulator adapted to retard cross-linkage, to effect copolymerization of said monomeric components, compounding the resulting copolymer with sulfur, and heating the compounded mixture to effect vulcanization.

6. The process of claim 5 wherein the polymerization regulator comprises acrylonitrile.

7. The process of claim 5 wherein the polymerization regulator comprises dodecyl mercaptan.

WILLIAM C. MAST.
LEE T. SMITH.
CHARLES H. FISHER.

REFERENCES CITED

The following references are of record in the file of this patent:

UNITED STATES PATENTS

| Number | Name | Date |
|---|---|---|
| 1,121,134 | Rohm | Dec. 15, 1914 |
| 2,105,361 | Nowak | Jan. 11, 1938 |
| 2,202,846 | Garvey | June 4, 1940 |
| 2,374,078 | Coffman | Apr. 17, 1945 |
| 2,393,438 | Weisberg | Jan. 22, 1946 |

FOREIGN PATENTS

| Number | Country | Date |
|---|---|---|
| 119,129 | Australia | Nov. 9, 1944 |

OTHER REFERENCES

Norrish Proc. Royal Society (1937), A 163, pages 205–220.

India Rubber World, April 1944, vol. 110, page 74.

Ind. and Eng. Chem., vol. 36, pages 1022–1035, Nov. 1944.